United States Patent
Lopez et al.

(10) Patent No.: US 7,753,287 B2
(45) Date of Patent: Jul. 13, 2010

(54) CLEANING SYSTEM FOR HEADLAMPS OF MOTOR VEHICLES

(75) Inventors: Miguel Mota Lopez, Rubi (ES); Juan Jesus Elvira Peralta, Rubi (ES)

(73) Assignee: Fico Cables, S.A., Barcelona (ES)

( * ) Notice: Subject to any disclaimer, the term of this patent is extended or adjusted under 35 U.S.C. 154(b) by 331 days.

(21) Appl. No.: 10/983,144

(22) Filed: Nov. 5, 2004

(65) Prior Publication Data

US 2005/0150982 A1 Jul. 14, 2005

Related U.S. Application Data

(63) Continuation of application No. PCT/EP03/04838, filed on May 8, 2003.

(30) Foreign Application Priority Data

May 8, 2002 (DE) ................................ 102 20 579

(51) Int. Cl.
*B60S 1/46* (2006.01)
(52) U.S. Cl. .................... 239/284.1; 239/597; 239/599; 239/601; 239/284.2
(58) Field of Classification Search ............. 239/284.1, 239/284.2, 597, 599, 601
See application file for complete search history.

(56) References Cited

U.S. PATENT DOCUMENTS

| | | | | |
|---|---|---|---|---|
| 2,634,166 A | * | 4/1953 | Sacchini | ........................ 222/16 |
| 3,008,649 A | * | 11/1961 | Willy Bock et al. | ...... 239/284.1 |
| 3,141,617 A | * | 7/1964 | Spica | ........................ 239/284.1 |
| 3,199,787 A | * | 8/1965 | Oishei et al. | .............. 239/284.1 |
| 4,331,295 A | * | 5/1982 | Warihashi | ................. 239/284.1 |
| 4,600,361 A | | 7/1986 | Bianco | |
| 4,811,903 A | * | 3/1989 | Okuma et al. | ............. 239/284.2 |
| 5,344,293 A | | 9/1994 | Mota | |
| 5,605,286 A | * | 2/1997 | Orth et al. | ................. 239/284.2 |
| 5,762,271 A | * | 6/1998 | Lind et al. | ................ 239/284.2 |
| 5,975,431 A | | 11/1999 | Harita | |
| 5,984,644 A | * | 11/1999 | Yu et al. | ...................... 417/302 |
| 6,296,198 B1 | | 10/2001 | Tores | |

FOREIGN PATENT DOCUMENTS

| | | |
|---|---|---|
| AT | 202 015 B | 7/1958 |
| DE | 19 13 810 A | 10/1970 |
| DE | 71 06 520 U | 2/1971 |
| DE | 35 46 581 C2 | 3/1987 |
| DE | 38 31 380 A1 | 4/1989 |
| DE | 44 01 744 A1 | 7/1994 |
| DE | 19545565 A1 | 6/1997 |
| DE | 199 16 947 A | 10/2000 |
| DE | 199 049 89 A1 | 12/2002 |
| EP | 0262402 B1 | 3/1991 |

(Continued)

*Primary Examiner*—Dinh Q Nguyen
(74) *Attorney, Agent, or Firm*—Cooley LLP

(57) ABSTRACT

The present invention comprises a cleaning system for headlamps, windshields or other surfaces, particularly of motor vehicles, comprising a tube system with liquid reservoir and a pump for providing and supplying a cleaning liquid and a nozzle configuration with liquid exit for applying a cleaning liquid of a surface to be cleaned wherein said liquid exit comprises a curved slot and/or a sphere arrangement to apply the cleaning liquid with low liquid pressure onto the surface to be cleaned.

20 Claims, 7 Drawing Sheets

FOREIGN PATENT DOCUMENTS

| | | | |
|---|---|---|---|
| EP | 1099610 A1 | 5/2001 |
| EP | 1147956 A3 | 8/2003 |
| FR | 2 210 235 A | 7/1974 |
| FR | 2 681 031 A | 3/1993 |
| FR | 2 703 409 A | 10/1994 |
| FR | 2 738 203 A | 3/1997 |
| FR | 2868340 * | 4/2004 |
| GB | 1071420 | 6/1967 |
| JP | 63-065967 | 3/1988 |
| JP | 3009920 | 1/1991 |
| JP | HEI4-95859 | 8/1992 |
| JP | 07149208 A | 6/1995 |
| JP | 09-188227 | 7/1997 |
| JP | 09-315270 | 12/1997 |
| JP | 2001-347929 | 12/2001 |
| WO | WO 98/56628 | 12/1998 |
| WO | WO 01/02221 A3 | 1/2001 |

* cited by examiner (A)

(B)

(A) (B) (C)

(A)  (B)

(A)

(B)

CLEANING SYSTEM FOR HEADLAMPS OF MOTOR VEHICLES

PRIORITY

The present application is a continuation of International Application No. PCT/EP03/04838, filed May 8, 2003, entitled Cleaning System for Headlamps of Motor Vehicles, which is incorporated herein by reference and which claims the benefit of German Application No. 10220579.5 filed May 8, 2002.

FIELD OF THE INVENTION

The present invention relates to a cleaning system for headlamps, windshields and/or other surfaces, particularly of motor vehicles, as well as nozzle configurations which are used in this cleaning system.

BACKGROUND OF THE INVENTION

Although present devices are functional, they are not sufficiently accurate or otherwise satisfactory. Accordingly, a system and method are needed to address the shortfalls of present technology and to provide other new and innovative features.

In motor vehicles of different categories, cleaning systems for cleaning of headlamps and other surfaces are used. The outer surfaces of headlamps and windshields are subjected to a permanent influence of weather and dirt in the air. In order to guarantee the safety of the passengers of the vehicle, cleaning systems are used for the reduction of weather and dirt deposits on these surfaces.

Turning first to cleaning systems for headlamps. First developments in this field provided brush configurations which clean the surface of headlamps in a similar manner as screen wipers. These brush configurations are expensive mechanical arrangements which require high efforts in production and maintenance. Thus, they are expensive and inappropriate to be used in motor vehicles of all price categories.

A further development in this field consists in the cleaning of headlamps by means of high pressure systems. These systems are used to spray a cleaning fluid with high pressure onto the surface of headlamps. The cleaning is achieved by the impact of the cleaning liquid on the headlamp surface. However, the disadvantage of these systems consists in the fact that on the one hand high fluid volumes are necessary for such a cleaning and on the other hand the tube system, the nozzles and the pump for the conducting of the cleaning fluid have to be adapted to high pressure. Based on the technical requirements of the cleaning system, it is correspondingly expensive in its manufacture. Thus, this cleaning system is inappropriate to be installed in motor vehicles of lower price. A further disadvantage consist in the high consumption of cleaning liquid in these systems. The cleaning liquid is made of water and different additives such as antifreeze or other solvents. Since these additives have a strong impact on the environment, the consumption of cleaning liquid has to be reduced.

The WO 98/56628 discloses a cleaning system for headlamps which provides a reduced consumption of cleaning liquid compared to already known systems based on its construction including, for example, the nozzle configurations. However, at the walls of these nozzle configurations, the cleaning liquid is deviated several times which leads to a loss of pressure in the system. Therefore, high pressure is necessary to effectively spray the cleaning liquid on the headlamps. Accordingly, this pressure requires a corresponding stable construction of the cleaning system. Furthermore, the relatively big openings of the nozzle configuration lead to a high consumption of cleaning liquid.

It is therefore an object of the present invention to provide a cleaning system for headlamps and/or panes which cleans the surface of headlamps in a more effective and saving manner compared to the prior art.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The above problem is solved by a cleaning system for headlamps, windshields or other surfaces, particularly of motor vehicles according to claims 1 and 12, that uses fixed nozzles and telescopic nozzles according to claims 15 and 18, and that uses a pump arrangement according to claim 23.

The cleaning system may comprise a tube system having a liquid reservoir and a pump for providing and supplying a cleaning liquid, together with a nozzle configuration for applying the cleaning liquid onto a surface to be cleaned, wherein the nozzle configuration comprises a liquid exit in the form of a curved slot through which the cleaning liquid can exit. The system also may include a liquid pipe connected to the liquid exit that comprises a sphere-like arrangement adjacent to the liquid exit to deviate the cleaning liquid.

In the cleaning system of the present invention, a cleaning liquid is stored in a liquid reservoir wherein the liquid is transported by means of a pump in a tube system with a nozzle arrangement. The nozzle arrangement is preferably installed near the surface to be cleaned, such that cleaning is achieved by means of the cleaning liquid. The nozzle configuration preferably comprises an exit for the cleaning liquid which has the shape of a curved or bent slot. This shape enables spraying of the cleaning liquid with relatively low liquid pressure while maintaining effective cleaning. Since the curved slot enables a reduction of the working pressure of the cleaning system compared to the prior art, this also leads to a reduction of the consumption of cleaning liquid.

A further effective possibility for applying the cleaning liquid to the corresponding surfaces consists in the use of a sphere arrangement. The sphere is arranged in such a way that the cleaning liquid has to flow by the sphere before exiting the nozzle configuration. This flow guarantees an exit of the cleaning liquid from the nozzle arrangement which realizes an improved cleaning of the corresponding surface with reduced pressure and liquid consumption. The curved slot and sphere arrangements are preferred embodiments of the invention and may be singly or jointly installed in the nozzle configurations.

According to a further preferred embodiment of the invention, the curved slot has the shape of a segment of a circle. It is also preferred to arrange a sphere near the liquid exit of the nozzle configuration in order to divert and distribute the cleaning liquid.

The nozzle configuration is connected via a tube system with the liquid reservoir as well as with the pump. The pump transports a cleaning liquid from the liquid reservoir via the tube system to the nozzle configuration. The end of the tube system extends either shortly before the exit opening of the nozzle configuration, or it is connected to an inner liquid tube of the nozzle configuration. The liquid tube in the nozzle configuration preferably comprises at its end a sphere wherein the liquid exit is connected to the liquid tube despite the sphere. It is possible based on this construction that the cleaning liquid is pumped by the sphere in order to exit the nozzle configuration onto the surface to be cleaned. Based on the flow conditions in the cleaning liquid following from this arrangement, an effective cleaning of the corresponding surfaces is realized with low liquid pressure in the cleaning system.

According to a further preferred embodiment of the present invention, the sphere arrangement cooperates with the curved slot or with a linear slot.

As already mentioned above, the sphere arrangement as well as the curved slot realize an effective application of the cleaning liquid onto the surface to be cleaned. Thus, it is preferred to singly or jointly use the curved slot and sphere arrangement. The sphere arrangement is also effective in its operation when it is combined with a straight slot, a many-angled opening, or another exit of arbitrary shape.

According to a further preferred embodiment of the invention, the nozzle configuration is realized by a fixed nozzle or a telescopic nozzle.

The fixed nozzle comprises in this context a nozzle configuration which is non-displaceably installed for example on the bumper or on the car body of a motor vehicle. A telescopic nozzle, however, comprises a nozzle configuration which automatically telescopes during operation of the cleaning system in order to apply the cleaning liquid onto the surface to be cleaned. These telescopic nozzles consist, for example, of one or several hollow cylinders fitting into each other which are moved by the pressure of the cleaning liquid.

According to a further preferred embodiment of the invention, the telescopic nozzles are constructed with or without a valve for controlling the flow-through of the cleaning liquid.

Preferably, after the telescoping of the nozzle, an installed valve is opened, for example, by means of the liquid pressure. According to a further preferred embodiment of the invention, the use of such a valve is waived. In this case, the telescopic nozzle is configured in such a way that an opening for liquid supply inside the telescopic nozzle is opened as soon as the telescopic nozzle is positioned in the cleaning condition for the corresponding surface. This cleaning condition can comprise the completely telescoped state of the telescopic nozzle or it can refer to other positions of the telescopic nozzle. Thereby, it is possible to apply cleaning liquid onto the corresponding surface during the telescoping of the telescopic nozzle.

According to a further preferred embodiment of the invention, the telescopic nozzle comprises at least one hollow cylinder which can be displaced against the force of a spring and a valve on an end of the hollow cylinder that can be opened by the pressure of the cleaning liquid when the telescopic nozzle is telescoped.

Preferably, the valve is arranged at the end of the hollow cylinder which occupies the most extended position in the telescoped state of the telescopic nozzle. When the telescopic nozzle is completely telescoped, the valve is opened. Based on this chronological order and the arrangement of the telescopic nozzle, the consumption of cleaning liquid is limited. A further advantage consists in the fact that the valve is first opened in the telescoped state of the telescopic nozzle so that no cleaning liquid is sprayed onto vehicle parts which should not be cleaned.

According to a further preferred embodiment of the present invention, the telescopic nozzle comprises at least a first and a second hollow cylinder wherein the second hollow cylinder comprises an opening which is opened for the flow of cleaning liquid starting from a certain displacement position of the second hollow cylinder. The opening of the second hollow cylinder cooperates with a cross-sectional enlargement of the first hollow cylinder in this operation.

Preferably according to the invention, the present cleaning system is operated with a telescopic nozzle which comprises no valve configuration. In the opposite thereto, the telescopic nozzle comprises two hollow cylinders fitting into each other wherein the inner hollow cylinder comprises an opening for further conducting the cleaning liquid. While telescoping the telescopic nozzle, which is realized by the telescoping of the inner hollow cylinder out of the outer hollow cylinder, the opening remains closed based on its abutment of the wall of the outer hollow cylinder. If the telescopic nozzle is completely telescoped, the opening of the inner hollow cylinder reaches a position which is opposed to a cross-sectional enlargement of the outer hollow cylinder. Thereby, the opening in the inner hollow cylinder is released and cleaning liquid is supplied via the opening to the surface to be cleaned.

According to a further preferred embodiment, the pump for supplying the cleaning system according to the invention comprises an adjustable membrane in order to selectively release or close one of two exit openings. It is also preferred that the membrane be fixed in a neutral position or that the membrane be removable to simultaneously use both exit openings in the open state.

The pump of the cleaning system transports the cleaning liquid from the reservoir onto the surfaces to be cleaned. To this end, different tube systems can be supplied via different openings of the preferred pump. To realize quick and reliable control of the exit openings in the pump, an adjustable membrane is used. This membrane is qualified by short switching times as well as an effective closing of the corresponding exit opening. In case of a simultaneous supply of several exit openings, it is also preferred according to the invention to fix the membrane in a neutral position for example by a switching mechanism, or to completely remove this membrane.

The above problem is also solved by a cleaning system for headlamps, windshields and other surfaces, particularly of motor vehicles, comprising the following components: a tube system having a liquid reservoir and a pump for providing and supplying a cleaning liquid, and a telescopic nozzle having at least one hollow cylinder for applying the cleaning liquid onto a surface to be cleaned wherein the hollow cylinder comprises on one end a valve and near the other end an opening for controlling the flow of the cleaning liquid.

It is also preferred to operate the cleaning system by means of telescopic nozzles. This arrangement leads to an effective cleaning of the corresponding surfaces while at the same time reducing the necessary pressure for operating the cleaning system as compared to the prior art.

The present invention also provides a fixed nozzle for cleaning systems, particularly for motor vehicles, comprising a liquid exit for applying a cleaning liquid onto a surface to be cleaned wherein the liquid exit is shaped like a curved slot through which the cleaning liquid can exit or wherein a liquid pipe connected to the liquid exit comprises a sphere-like arrangement adjacent to the liquid exit to divert the cleaning liquid.

In another preferred form, the invention provides a telescopic nozzle for cleaning systems, particularly for motor vehicles, comprising at least one hollow cylinder for applying a cleaning liquid onto a surface to be cleaned wherein the hollow cylinder comprises on one end a valve and near the other end an opening for controlling the flow of the cleaning liquid.

According to a further preferred embodiment, the present invention provides a pump arrangement for cleaning systems, particularly for motor vehicles, comprising a rotor for transporting a cleaning liquid, and a distribution chamber having at least two liquid exits for distributing the cleaning liquid to a tube system, characterized in that an adjustable membrane can be switched in such a way that the transport of the cleaning liquid is specifically executed through one of the at least two liquid exits or such that the at least two liquid exits can be simultaneously supplied with the cleaning liquid.

Preferably, the cleaning liquid is transported by means of a pump arrangement. This pump arrangement comprises a distribution chamber which distributes the cleaning liquid to the connected tube system via liquid exits. Since the liquid exits can be selectively opened and closed by means of an adjustable membrane, the selective supply of different tube systems is possible. Preferably, only the headlamps or the headlamps and the vehicle windows are cleaned using separated tube systems.

According to a further preferred embodiment, the adjustable membrane can be switched between the at least two liquid exits by means of the rotation direction of the rotor.

Dependent on the rotation direction of the rotor, cleaning liquid is supplied from the rotor space via either the one or the other liquid entry to the distribution chamber. The liquid entries of the distribution chamber are situated near the opposed sides of the adjustable membrane. Because of this, the cleaning liquid flows against the membrane from different directions dependent whether the cleaning liquid enters the distribution chamber via the one or the other liquid entry. By the flowing against the membrane, the membrane is pushed in a certain direction in order to close the liquid exit situated at this position. At the same time, the liquid exit previously closed is opened by this membrane motion.

It is furthermore preferred according to the invention to arrange the liquid exits parallel or perpendicular to the rotor axle. Additionally, the rotor preferably comprises at least two rotor blades wherein by means of their lengths and shape a fluid quantity can be varied.

According to a further preferred embodiment of the invention, the orientation and arrangement of the liquid exits is varied so that the tube systems can be optimally connected and run. It is further preferred to equip the liquid exits with ball joints so that their orientation can be arbitrarily adapted to the connected tube system. In this manner, for example a kinking of the tubes is prevented. It is further preferred to vary the length and the shape of the rotor blades. It enables an optimal adaptation of the liquid quantity to the surface to be cleaned, e.g. headlamps or vehicle windows.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

The present invention and its preferred embodiments are described with reference to the accompanying drawings wherein, FIG. 1 a cleaning system according to a preferred embodiment of the present invention for the simultaneous and alternative cleaning of the windshield and the headlamps of a motor vehicle.

DETAILED DESCRIPTION

The present invention relates to a cleaning system for headlamps, windshields, and other surfaces. In the following, the cleaning system according to the invention is described particularly in view of the background of the application for cleaning the headlamps.

Based on the high security requirements in traffic, it is of importance that good visibility for the driver is guaranteed supported by clean headlamps. This visibility must not be affected by weather influences or dirt on the street. In addition to the task to permanently provide clean headlamps of the motor vehicle by means of a cleaning system, it is also desirable to have no additional environmental impact by the chemicals which are typically used in the liquid of the cleaning system. It is therefore a further object of some of the embodiments of the present invention to minimize the liquid consumption as far as possible in the cleaning system. This is particularly achieved by operating the cleaning system with low pressure. Despite the case of low pressure, however, an efficient cleaning of the headlamps is realized by means of the nozzle configurations according to the invention.

Figure 1:
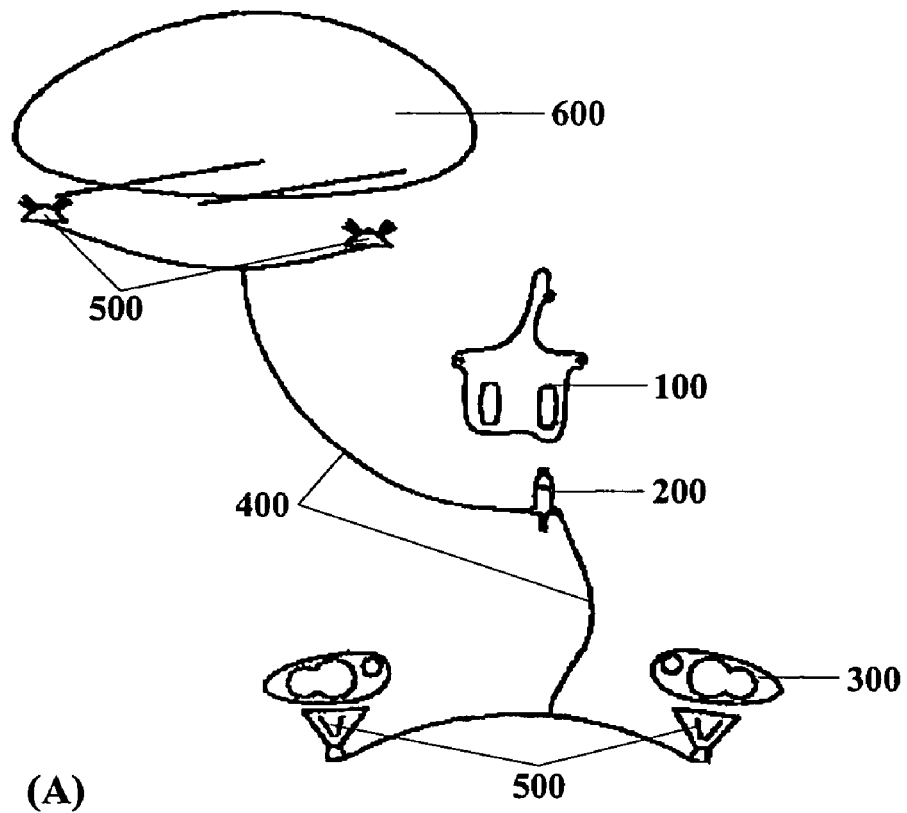
Figure 1:
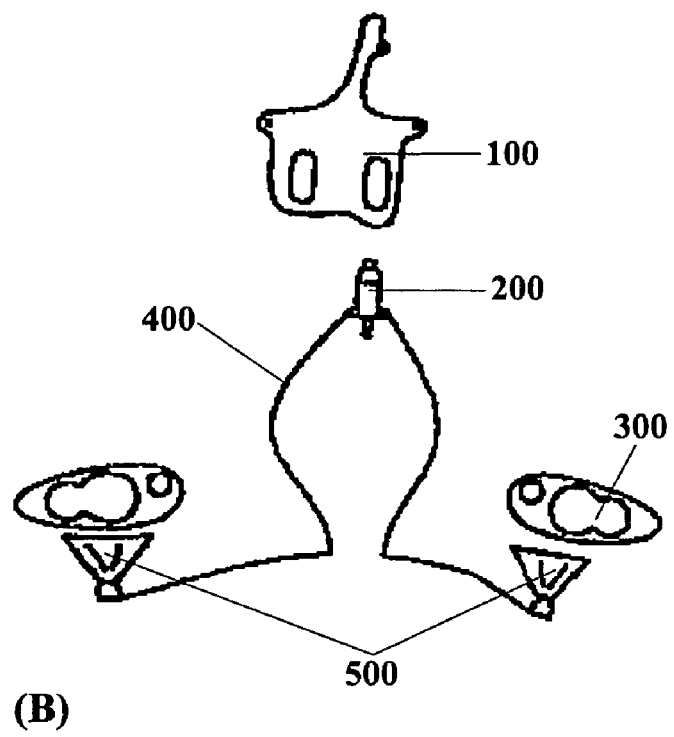

Preferred embodiments of the present invention are shown as an overview in FIGS. 1A and 1B. The cleaning system according to the invention for headlamps 300 and vehicle windows 600 comprises a liquid reservoir 100 for storing the cleaning liquid. This liquid reservoir 100 is connected to a pump 200 transporting the cleaning liquid via a connected tube system 400 to the surfaces to be cleaned. The pump 200 preferably comprises two liquid exits for further supplying the cleaning liquid. Via the liquid exits, cleaning liquid is preferably simultaneously or separately supplied to the connected nozzle arrangements 500 via the tube system 400. The nozzle arrangement is preferably formed by a rigidly installed or fixed nozzle or, alternatively, by a telescopic nozzle. According to a further preferred embodiment of the invention, only the windows/windshield 600 of the motor vehicle or only the headlamps 300 are cleaned wherein said headlamps 300 or the different windows 600 can be simultaneously or alternately washed (cf. FIG. 1B).

The tube system 400 leads to the nozzle configurations 500 which are arranged in front of or near the surfaces to be cleaned of the headlamps 300. A preferred embodiment of the present invention comprises a further tube system with nozzle configurations 500 which supply the windshields 600 as well as the rear window of the motor vehicle with cleaning liquid. The nozzle configurations 500 at the ends of the tube system are preferably fixed nozzles 10 and/or telescopic nozzles 20.

By the designation fixed nozzles 10, a rigidly installed nozzle configuration is understood as, for example, on the bumper of the motor vehicle. This fixed nozzle 10 is permanently visible from the outside and arranged nearby or in front of the surfaces to be cleaned. The telescopic nozzles 20, however, are installed in a suppressed state in the car body. During use of the cleaning system according to the invention, these telescopic nozzles 20, for example, move out of the bumper and spray the surfaces to be cleaned with cleaning liquid.

The fixed nozzles 10 and the telescopic nozzles 20 according to the invention are qualified by the configuration of the exit opening for a cleaning liquid according to the invention. The exit opening of the cleaning liquid in the nozzles 10, 20 preferably has the shape of a curved slot 40. The curved slot 40 is banana shaped or it is similarly shaped to a slot along a segment of a circle as illustrated in FIG. 2B. If the upper part of the nozzle 10, 20 is cut from the remaining nozzle configuration by enlarging said curved slot 40, a curved surface would be generated instead a plane interface.

The curve shape of the curved slot 40 is also emphasized by the following description. A straight line (not shown) runs through the vertex S of the curved slot (cf. FIG. 2B) and through the center of the sphere-shaped upper part 11, 21 of the nozzle 10, 20. Where the curved slot 40 is depicted in a plane transverse to the straight line and arranged in front of said slot 40, the curved slot 40 is also pictured as a segment of a circle in said plane in so far as the viewer is situated on this straight line.

This curved slot 40 can be used in fixed nozzles 10 as well as in telescopic nozzles 20. Preferably, the vertex of the curved slot 40 is arranged at the deepest point of the curved slot 40 as can be seen in FIG. 2B. It is also preferred according to the invention to use the curved slot 40 in other orientations in the fixed nozzle 10 and the telescopic nozzle 20.

The curved shape of the curved slot 40 realizes an effective application and distribution of the cleaning liquid on the surface to be cleaned whereby an optimal cleaning is achieved. As can be seen in the sectional view in FIGS. 2A and C, the slot 40 is arranged in a sphere 11, 21 which is adjustable in the respective nozzle. By the adjustment of this sphere 11, 21, the stream of the cleaning liquid coming out of the curved slot is adjusted to the surfaces to be cleaned. It can also be seen in FIG. 2 that the slot 40 is preferably straightly configured in the inner of the sphere 11, 21 to prevent an often reflecting or diverting of the cleaning liquid during flow through the slot 40. In this manner, it is preferably realized that the cleaning liquid is effectively applied to the surfaces to be cleaned also with low pressure in the system.

Figure 3:
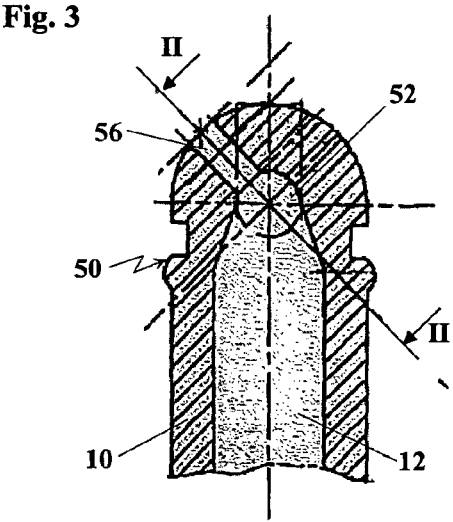
FIG. 3: The sphere arrangement in a fixed nozzle.
Figure 4:
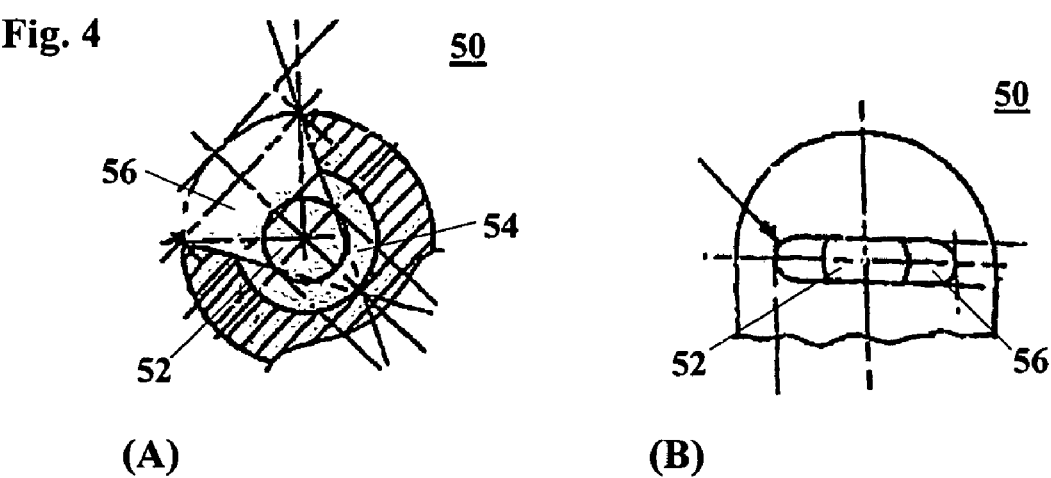
FIG. 4: The cut-through sphere arrangement along the line II-II in FIG. 3(A) and the sphere arrangement with straight slot (B)

The construction of the fixed nozzle 10 and the telescopic nozzle 20 is described in the following on the basis of the fixed nozzle 10, since the following constructive features can be arbitrarily used in both nozzle configurations. The slot 40 is supplied with cleaning liquid via a liquid pipe 12, 22. Preferably, the liquid pipe 12, 22 comprises a sphere arrangement for manipulating the flow path of the cleaning liquid. A preferred embodiment of this sphere arrangement is shown in FIG. 3. At the end of the liquid pipe 12, i.e. shortly before the exit opening of the nozzle 20, a sphere is preferably arranged diverting the cleaning liquid. A detailed illustration of the sphere arrangement according to the invention is shown in FIG. 4A which depicts a sectional view along the line II-II in FIG. 3. As can be seen on the basis of FIG. 4A, the sphere 52 of the sphere arrangement 50 is centrally arranged in the liquid pipe 12. Furthermore, the sphere 52 is peripherically surrounded by a slot 54 which passes the cleaning liquid. The surrounding slot 54 runs into an exit opening 56 for a cleaning liquid. By the use of the sphere 52, a deviation of the cleaning liquid is realized connected to low pressure losses in the cleaning system. At the same time, the cleaning liquid achieves an optimal cleaning effect due to its impact on the surface to be cleaned. This inventive construction forms the basis for the operation of the cleaning system according to the invention at low pressure. It is also preferred to use other bodies instead of a sphere, e.g. angled or oval bodies, as long as they manipulate the flow conditions according to the present inventive idea. Preferably, the exit opening 56 is configured as a curved slot 40 or as a straight slot (confer FIG. 4B). It is also preferred to combine the sphere arrangement 50 with further arbitrary slot-shaped exit openings for a cleaning liquid.

Figure 2:
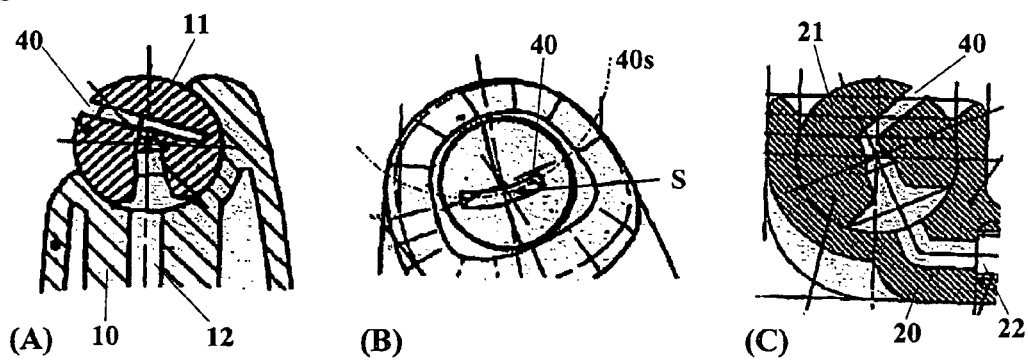
FIG. 2: The liquid exit of a fixed nozzle (A) and a telescopic nozzle (C) with curved slot (B)

Thus, the sphere arrangement 50 according to the invention shown in FIGS. 2 and 3 can be used in fixed nozzles 10 as well as in telescopic nozzles 20.

According to a further preferred embodiment of the invention, the telescopic nozzles 20 are used in the cleaning system for spraying the surfaces to be cleaned with cleaning liquid. According to a first preferred embodiment of the invention, the cleaning system is used with a telescopic nozzle 20 comprising a valve 24 (see FIG. 5). According to a further preferred embodiment of the telescopic nozzle 20 according to the invention, the supply of cleaning liquid is not executed via a valve but via an opening 30 (see FIG. 6).

Figure 5:
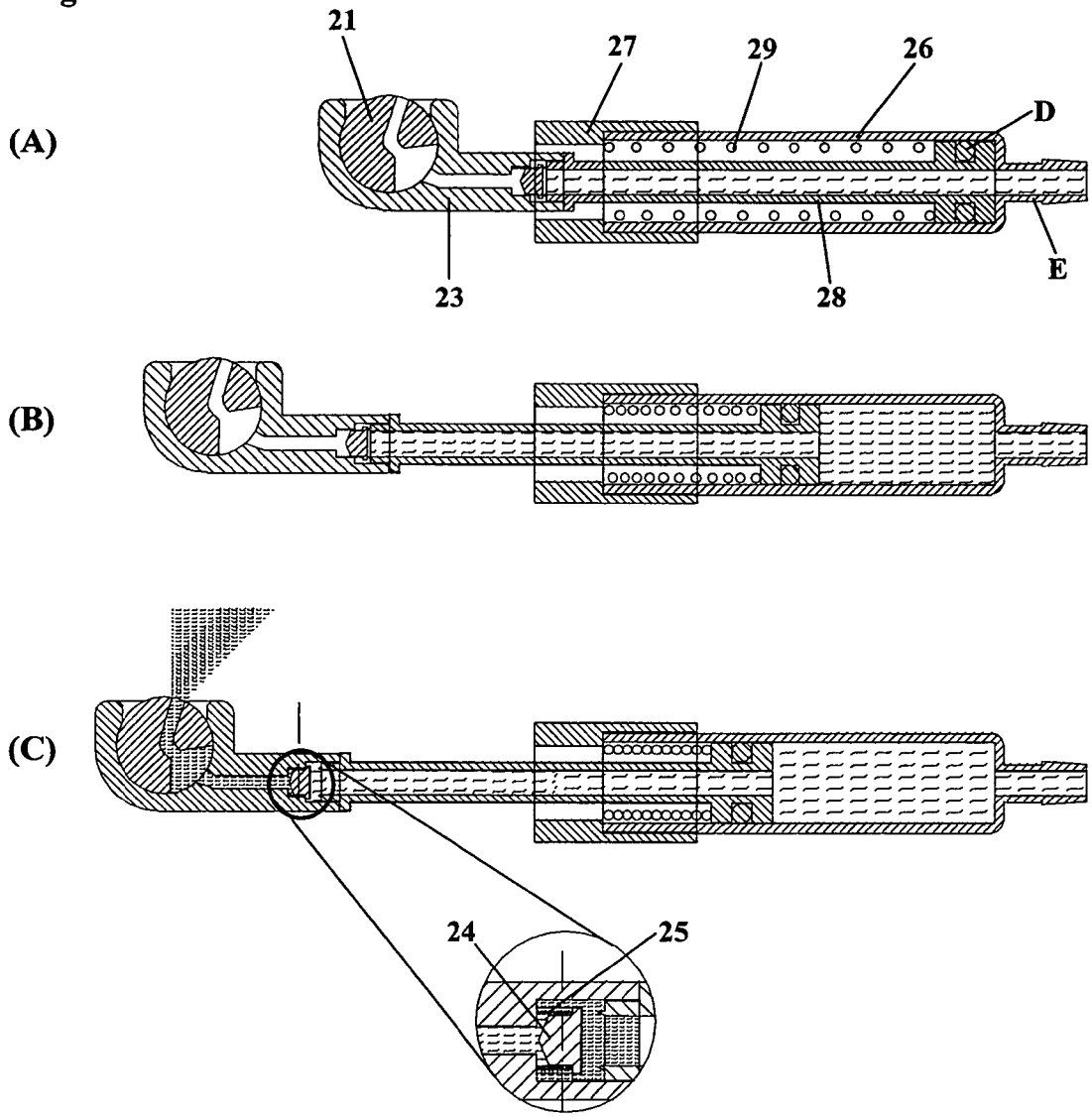
FIG. 5: The telescopic nozzle with valve in different states (A, B, C) according to a preferred embodiment of the present invention.

Referring to FIG. 5, a telescopic nozzle 20 with valve 23 is described in the following passage. FIG. 5A shows a telescopic nozzle 20 according to the invention in its basic state. This telescopic nozzle 20 is made of an outer hollow cylinder 26 and a hollow cylinder 28 displaceably arranged therein. The hollow cylinder 26 is mounted in a type of a bushing 27. This bushing 27 forms an inner projection at the end of the outer hollow cylinder 26 at which a spring 29 supports. The spring 29 runs in the inner of the outer hollow cylinder 26. The inner hollow cylinder 28 has a T-shaped configuration at one end opposed to the liquid exit of the telescopic nozzle 20 if seen in the sectional view. The T-shaped configuration allows support of the spring 29 at the inner hollow cylinder 28. The inside of the inner hollow cylinder 28 is not closed by the T-shaped configuration. Thus, it can be filled with cleaning liquid.

The other end of the inner hollow cylinder 28 is closed by a valve 24. The valve 24 is preferably configured by a cylindrical body which is pressed by a spring 25 against the opening of the inner hollow cylinder 28. By means of the biased cylindrical body 24 and by means of said spring 25, said second opening of said inner hollow cylinder 28 is closed. To this end, the spring 25 supports at the guiding part 23 with sphere 21 of the telescopic nozzle 20.

In case the telescopic nozzle 20 according to the invention is supplied with cleaning liquid via the liquid entry E, the cleaning liquid first fills the inside of the inner hollow cylinder 28 (see FIG. 5A). During a further supply of cleaning liquid, the inner hollow cylinder 28 is pushed against the force of the spring 29 out of the outer hollow cylinder 26. In this process, the room freed by the inner hollow cylinder 28 is filled by cleaning liquid and the cleaning liquid supports the pushing out of the inner hollow cylinder 28 out of the outer hollow cylinder 26 by its acting on the T-shaped end of the inner hollow cylinder 28 (see FIG. 5B). The cleaning liquid cannot flow by the T-shaped end of the inner hollow cylinder 28 since it is prevented by a ring-shaped sealing D. During displacement of the inner hollow cylinder 28, the valve 24 remains closed. In case the inner hollow cylinder 28 reaches its final position, i.e. the spring 29 is in a completely compressed state, the pressure of the cleaning liquid in the inside of the inner hollow cylinder 28 is sufficiently high to open the valve 24 against the force of the spring 25 (confer FIG. 5C). At this moment, the cleaning liquid can be applied to the surface to be cleaned via the guiding part 23 of the telescopic nozzle 20. Based on the preferred configuration of the telescopic nozzle 20 with valve 24, an effective cleaning of the corresponding surfaces is realized, and the consumption of cleaning liquid is minimized.

Figure 6:
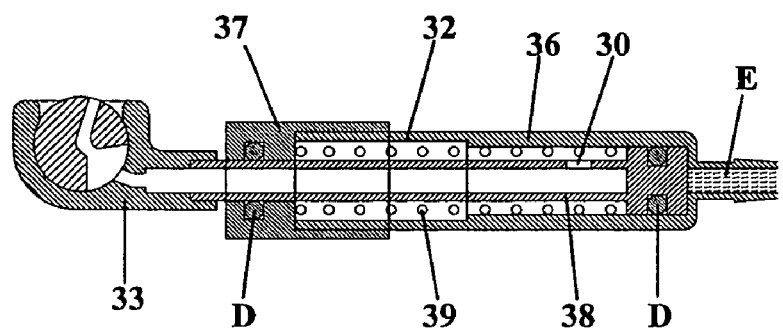
FIG. 6: The telescopic nozzle with opening in different states (A, B) according to a preferred embodiment of the present invention.
Figure 6:
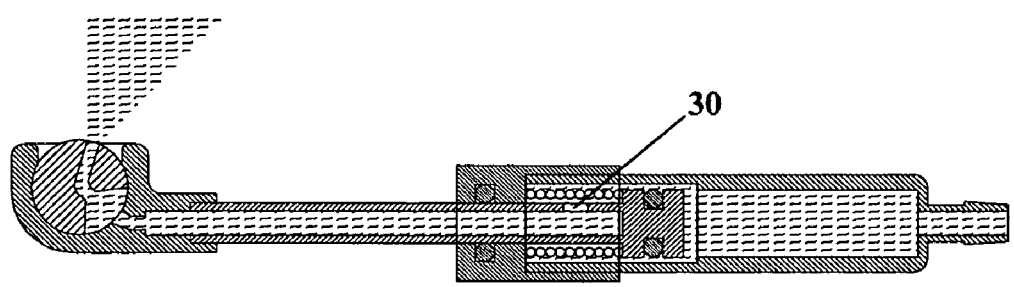

According to a further preferred embodiment of the telescopic nozzle 20, the nozzle 20 does not comprise a valve but an opening 30 as shown in FIG. 6. Preferably, the telescopic nozzle 20 with opening 30 is formed by an outer hollow cylinder 36 and an inner hollow cylinder 38. The inner hollow cylinder 38 is displaceably arranged in the outer hollow cylinder 36 wherein one of its ends is connected to a guiding part 33 of said telescopic nozzle 20. The other end of the inner hollow cylinder 38 is T-shaped. The T-part sealingly abuts the inner wall of the outer hollow cylinder 36 supported by a sealing D. Furthermore, the inner hollow cylinder 38 qualifies by comprising an opening 30. The outer hollow cylinder 36 comprises at one end a connection E for the tube system of the cleaning system. The other end is closed by a bushing 37 which serves also to guide the inner hollow cylinder 38 during its displacement. During displacement, the bushing 37 is sealed by the sealing D. At the inner wall of the outer hollow cylinder 36, a portion having a greater inner cross-section is located which is described as cross-sectional enlargement 32. Further, a spring 39 runs inside the inner of the outer hollow cylinder 36 supported between the bushing 37 and the T-shaped end of the inner hollow cylinder 38 (confer FIG. 6A).

If the cleaning liquid is supplied via the tube system of the cleaning system to the connection E of the outer hollow cylinder 36 of the telescopic nozzle 20 with opening 30, the cleaning liquid presses against the T-shaped end of the inner hollow cylinder 38. The liquid pressure is sufficiently high to push the inner hollow cylinder 38 out of the outer hollow cylinder 36 against the force of the spring 39. With increasing compression of the spring 39, the T-shaped end of the inner hollow cylinder 38 approaches the cross-sectional enlargement 32 of the outer hollow cylinder 36. As long as the T-shaped end of the inner hollow cylinder 38 does not reach the cross-section enlargement 32 of the outer hollow cylinder 36, the cleaning liquid is only positioned on the right of the T-shaped end of the inner hollow cylinder 38 (see FIG. 6B). As soon as the T-shaped end of the inner hollow cylinder 38 is displaced into the portion of the cross-sectional enlargement 32, the cleaning liquid flows therein. This state approximately corresponds to the maximum compression of the spring 39. Since the cleaning liquid now also fills the area of the cross-sectional enlargement 32, the liquid penetrates the inside of the inner hollow cylinder 38 via the opening 30 and exits the sphere 21 of the guiding part 33 of the telescopic nozzle 20 as a cleaning stream. As soon as the cleaning process of the cleaning system is finished, the liquid pressure in the tube system is reduced. The reduced pressure leads to the effect that the spring 39 can move the inner hollow cylinder 38 against the liquid pressure in the direction of the connection E. By this movement, the T-shaped end of the inner hollow cylinder 38 closes the portion of the cross-sectional enlargement 32 so that no further cleaning liquid can be supplied. Thus, the cleaning process of the surface is finished at this time. During a further pressure reduction in the cleaning liquid, the spring 39 is completely released whereby the inner hollow cylinder 38 is returned to its initial position.

Figure 7:
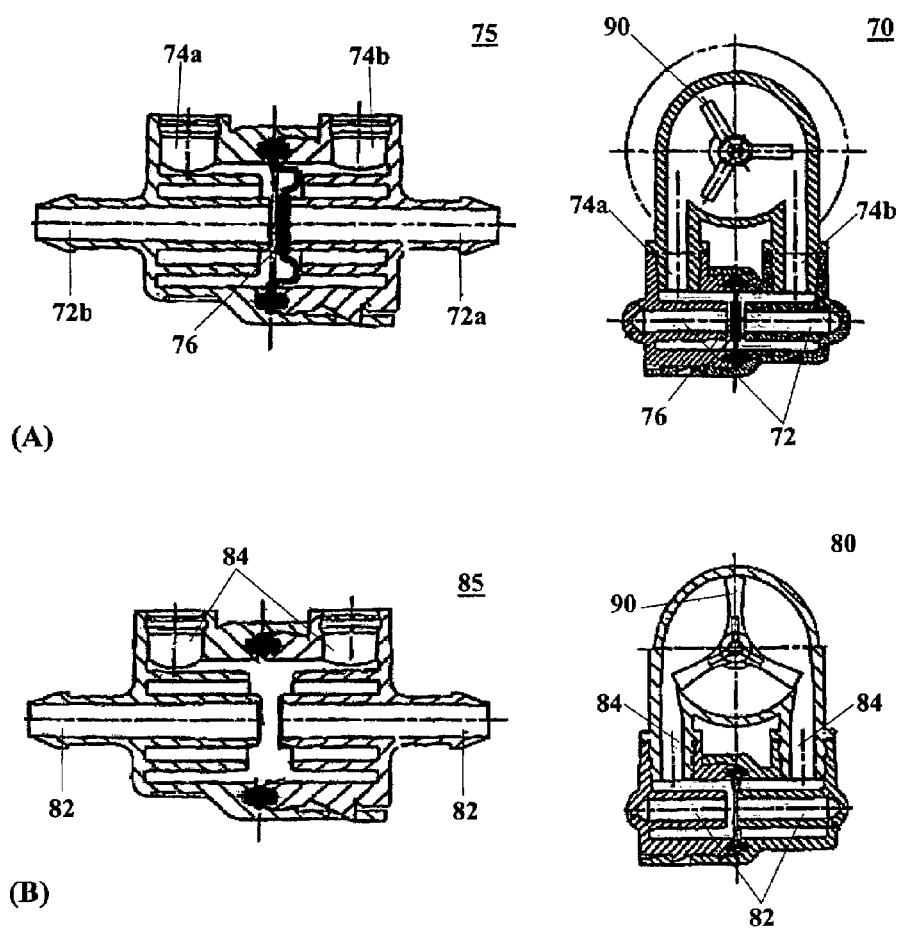
FIG. 7: The pump arrangement with a controlling of the exit openings according to a preferred embodiment of the present invention.

According to a further preferred embodiment of the invention, the cleaning system comprises a pump 70, 80 with a distribution chamber 75, 85. The different preferred embodiments are shown in FIG. 7. The cleaning liquid is transported within the pump 70, 80 by a rotor 90. The rotor 90 is preferably provided with different lengths and shapes of the rotor blades (see FIGS. 7A and B). With increasing lengths of the rotor blades which maximally extend up to the inner pump housing, cleaning liquid is transported to a greater extend. In this manner, the liquid quantity is determined by means of the length of the rotor blades, their shape, as well as the rotor speed.

Figure 8:
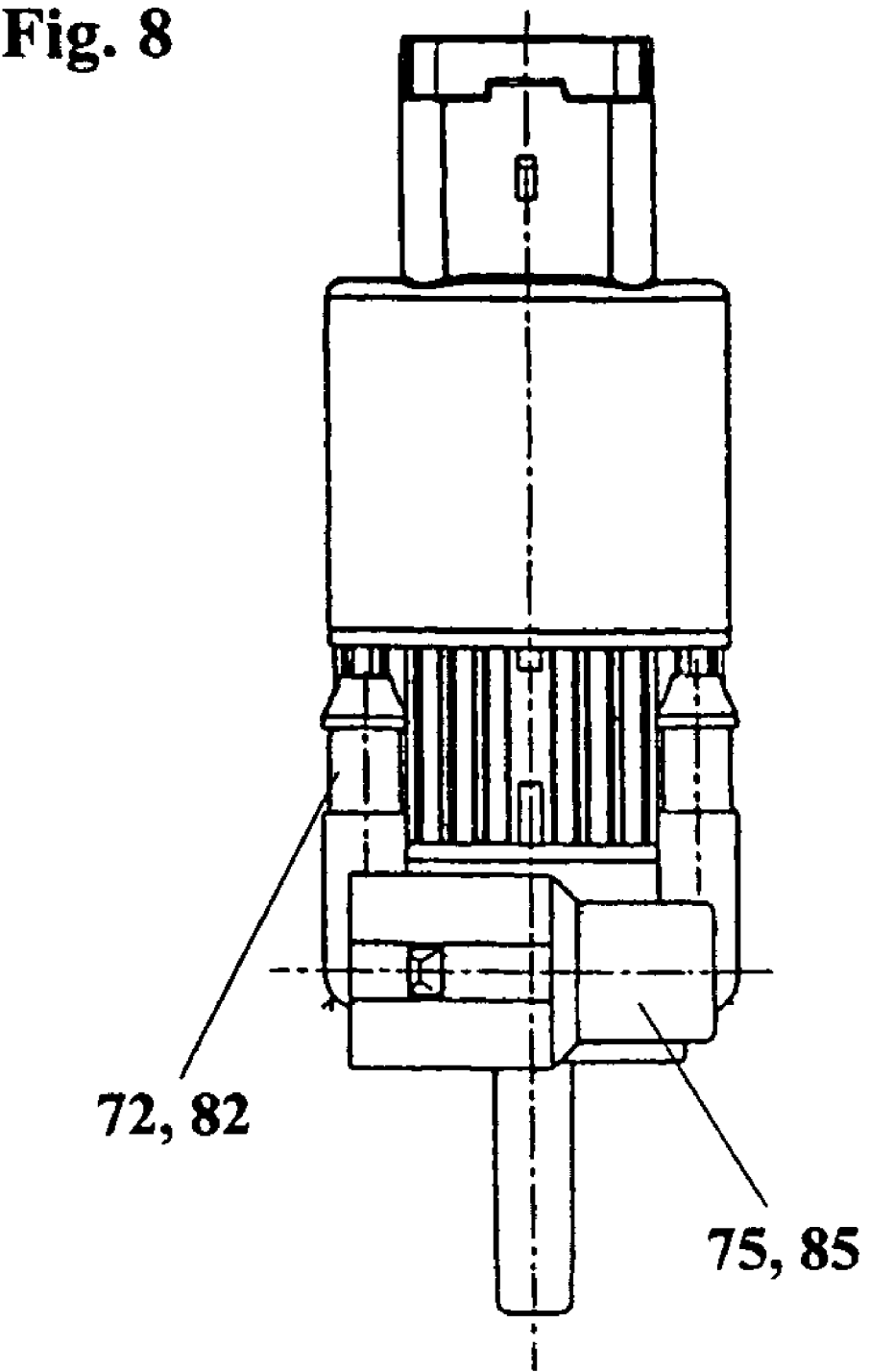
FIG. 8 a pump arrangement according to a preferred embodiment of the present invention having vertical liquid exits arranged parallel to the rotor axle.

The distribution chambers 75, 85 preferably comprise two liquid exits 72, 82 as well as two liquid entries 74, 84, respectively. Via the liquid entries 74, 84, the liquid is transported from the pump chamber with rotor 90 to the liquid exits 72, 82. The liquid exits 72, 82 are preferably horizontally (cf. FIG. 7a, b) or vertically oriented (that is 90° shifted to the arrangement shown in FIG. 7a, b) to realize an optimal connection to the tube system. In other words, the liquid exits 72, 82 are preferably parallel or vertical to the axle of the rotor 90. The preferably vertical orientation of the liquid exits 72, 82 is shown in FIG. 8. In this manner, the tube system can be run more simply and the liquid transport can be realized more effectively. Dependent on the respectively preferred embodiment of the distribution chamber 75, 85, a separation membrane 76 may be arranged near the liquid exits 72 of the distribution chamber 75. This separation membrane 76 serves for closing or releasing the liquid exits 72 dependent on the operation mode of the pump 70 with distribution chambers 75.

If the rotor 90 of the pump arrangement shown in FIG. 7A rotates clockwise, the cleaning liquid is conveyed via the liquid exit 74a to the distribution chamber. Based on the flow direction and the pressure of the cleaning liquid, the separation membrane 76 is pressed to the left and closes the liquid exit 72b. In case the rotor 90 turns anti-clockwise, the liquid entry 74b is supplied with cleaning liquid so that in the same manner as described above, the separation membrane 76 is pressed to the right to close the liquid exit 72a. In comparison to known arrangements of the prior art, e.g. a plunger arrangement, this separation membrane 76 has the advantage that switching times having approximately no delay are provided based on its flexibility and its low mass. Further, this membrane optimally adapts to the opening of the respective liquid exit so that an efficient closing and, thus, no loss of cleaning liquid is realized. Additionally, said separation membrane 76 is cheap in its production and requires low maintenance efforts in its technical arrangement in the distribution chamber 75.

Referring to the above described example, either the liquid exit 72a or the liquid exit 72b of the distribution chamber 75 is supplied with cleaning liquid. The different activation of the liquid exits 72a, 72b is carried out as described above dependent on the rotation direction of the rotor 90. Preferably, the cleaning system for headlamps is connected to the liquid exit 72a. According to a further preferred embodiment, the cleaning system for the windshield and the rear window of the motor vehicle is connected to the liquid exit 72b. The separation of the cleaning system has the advantage that the headlamps as well as the windows of the motor vehicle are not washed in every cleaning cycle. In this manner, for example the consumption of cleaning liquid is minimized. Furthermore, the above described and preferred embodiment of the distribution chamber of the pump arrangement of the cleaning system realizes a cleaning mode meeting the high security standards in traffic. To guarantee good visibility for the driver particularly in the dark, first the windows of the motor vehicle are cleaned during operation of the cleaning system. Subsequently, the cleaning system according to the invention switches to the cleaning of the headlamps. This control mode is achieved by internal electronics of the pump which first triggers a rotor turn in the direction for supplying the liquid exit 72a. After the windows of the motor vehicle have been sufficiently cleaned, the electronic control of the pump arrangement independently switches to the opposed rotation direction of the rotor 90 so that the liquid exit 72b is supplied with cleaning liquid. The cleaning liquid is then conveyed via the liquid exits 72b to the corresponding headlamps to clean them.

According to a further preferred embodiment of the invention, both liquid exits 72a, 72b are respectively connected to tube systems each leading to one of the two headlamps. Since dependent on the rotation direction of the rotor 90 either the liquid exit 72A or the liquid exit 72B is supplied, the headlamps are preferably washed in an alternating mode. In case the separating membrane 76 is positioned in an intermediate position between both liquid exits 72A, 72B, both liquid exits 72A, 72B are supplied with cleaning liquid at the same time. In this manner, a simultaneous washing is possible via the connected tube systems.

According to a further preferred embodiment of the present invention (see FIG. 7B), the pump 80 of the cleaning system is provided with a distribution chamber 85 which comprises no separation membrane. Based on this preferred construction, both liquid exits 82 are supplied at the same time with cleaning liquid via the liquid entries 84 of the distribution chamber 85 during operation of the pump 80. It is thus preferred to simultaneously trigger different tube systems of the cleaning system by this arrangement. A preferred embodiment of the connected tube system cleans the headlamps of the motor vehicle. To this end, each liquid exit 82 is connected to the tube system leading directly to the corresponding headlamps of the motor vehicle. Therefore, the preferred embodiment of the present invention describes a cleaning system only used for headlamps of the motor vehicle. Based on the higher quantity of cleaning liquid simultaneously transported through the liquid exits 82, a faster cleaning of the respective headlamps of the motor vehicle is carried out compared to known cleaning systems of the prior art. It is further preferred to connect to the simultaneously supplied liquid exits 72A, 72B the tube system for the headlamps and the tube system for the vehicle windows. In this manner, a simultaneous cleaning is provided. Further, a simultaneous cleaning is realized by connecting the branched tube system to a pump having only one liquid exit. In this manner, either the headlamps themselves can be cleaned or the headlamps and the windows can be cleaned.

This simultaneous supply of the liquid exits 72 of the distribution chamber 75 is, however, also possible in the preferred embodiment according to the invention of the distribution chamber 75 with separation membrane 76. To this end, the separation membrane 76 is preferably equipped with an adjusting or switching mechanism which can displace and fix the separation membrane 76 in a neutral position. This neutral position of the separation membrane 76 guarantees a supply of the liquid exits 72 with cleaning liquid at the same time. Correspondingly, the cleaning systems connected to the liquid exits 72 are triggered and supplied with cleaning liquid at the same time.

According to a further preferred embodiment of the present invention, the electronics for controlling the pump arrangement according to the invention are directly integrated in the pump. The electronic arrangement comprises control circuits for the respective cleaning mode which is used dependent on the rotation direction of the rotor 90 by means of the pump 70, 80. In this electronic control, preferably standard cleaning programs or cleaning times can be chosen dependent on the vehicle type, or quantities of the cleaning liquid can be adjusted via the rotor velocity and the rotation time of the rotor. As mentioned above, the preferred electronic control of the pump arrangement is directly arranged in the pump housing. A compact configuration of the cleaning system as well as reduced installation efforts follow therefrom. The cleaning system of the present invention is thus installed in the respective motor vehicle like a module and has only to be connected to the voltage supply and the switch in the passenger compartment of the motor vehicle. The other settings, as for example, the cleaning cycle and the cleaning mode, are executed during the manufacture of the motor vehicle and require no further electronic installations in the passenger compartment.

LIST OF REFERENCE NUMBERS

10 Fixed nozzle
11, 21 Sphere
12, 22 Liquid pipe
20 Telescopic nozzle
23 Guiding part
24 Valve
25 Spring of the valve
26 Outer hollow cylinder
27 Bushing
28 Inner hollow cylinder
29 Spring
30 Opening
32 Cross-sectional enlargement
33 Guiding part
36 Outer hollow cylinder
37 Bushing
38 Inner hollow cylinder
40 Curved slot
40s Segment of a circle
50 Sphere arrangement
52 Sphere
54 Surrounding slot
56 Exit opening
70, 80 Pumps
72, 82 Liquid exit
74, 84 Liquid entry
75, 85 Distribution chamber
76 Separation membrane
90 Rotor
100 Reservoir
200 Pump
300 Headlamps
400 Tube system
500 Nozzle arrangement
600 Windshield
A Connection
S Vertex In conclusion, the present invention provides, among other things, a system and method for cleaning headlamps, windshields, and other surfaces of a vehicle. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A cleaning system, particularly for motor vehicles, comprising:
   a. a tube system having a liquid reservoir and a pump for providing and supplying a cleaning liquid;
   b. a nozzle configuration for applying said cleaning liquid onto a surface to be cleaned, wherein
   c. said nozzle configuration comprises a liquid exit in the form of a slot through which the cleaning liquid can exit; and
   d. a liquid pipe connected to said liquid exit comprising a sphere-like element arranged within said liquid pipe adjacent to said liquid exit;
   e. wherein said liquid pipe further comprises a slot peripherally surrounding said sphere-like element and running into said liquid exit to deviate said cleaning liquid by causing said cleaning liquid to flow along said sphere-like element through said peripherally surrounding slot prior to exiting said liquid exit.

2. The cleaning system according to claim 1, wherein said curved slot has the shape of a segment of a circle.

3. The cleaning system according to claim 2, wherein said nozzle configuration is formed by a fixed nozzle or by a telescopic nozzle.

4. The cleaning system according to claim 3, wherein said telescopic nozzle is constructed with or without a valve for controlling the through-flow of said cleaning liquid.

5. The cleaning system according to claim 4, wherein said telescopic nozzle comprises at least one hollow cylinder which can be displaced against the force of a spring and wherein a valve on one of its ends can be opened by the pressure of said cleaning liquid when the telescopic nozzle is telescoped.

6. The cleaning system according to claim 4, wherein said telescopic nozzle comprises at least a first and a second hollow cylinder wherein said second hollow cylinder comprises an opening which is released for the through-flow of said cleaning liquid starting from a certain displacement position of said second hollow cylinder.

7. The cleaning system according to claim 6, wherein said opening of said second hollow cylinder cooperates with a cross-sectional enlargement of said first hollow cylinder.

8. The cleaning system according to claim 4, wherein the pump comprises an adjustable membrane to selectively release or close one of two exit openings.

9. The cleaning system according to claim 8, wherein said membrane can be fixed in a neutral position or wherein said membrane can be waived in order to simultaneously use both exit openings in the open state.

10. The cleaning system according to claim 1, wherein said sphere-like element cooperates with said curved slot or with a straight slot.

11. A cleaning system for headlamps and/or panes, particularly of motor vehicles, comprising:
    a. a tube system having a liquid reservoir and a pump for providing and supplying a cleaning liquid; and
    b. a telescopic nozzle having at least one hollow cylinder for applying said cleaning liquid onto a surface to be cleaned, wherein
    c. said hollow cylinder comprises on one end a valve or near the other end an opening for controlling the through-flow of said cleaning liquid and
    d. the telescopic nozzle comprises a liquid exit with a sphere-like element arranged within a liquid pipe adjacent to said liquid exit,
    e. said liquid pipe further comprising a slot peripherally surrounding said sphere-like element and running into said liquid exit to deviate said cleaning liquid by causing said cleaning liquid to flow along said sphere-like element through said slot prior to exiting said liquid exit.

12. The cleaning system according to claim 11, wherein said hollow cylinder can be displaced against the force of a spring and wherein said valve can be opened by the pressure of said cleaning liquid when said telescopic nozzle is telescoped.

13. The cleaning system according to claim 11, wherein said telescopic nozzle comprises a further hollow cylinder having a cross-sectional enlargement which cooperates with said opening of said other hollow cylinder in a certain displacement position of said other hollow cylinder to allow the through-flow of said cleaning liquid through said opening.

14. A fixed nozzle for a cleaning system, particularly for motor vehicles, comprising a liquid exit for applying a cleaning liquid onto a surface to be cleaned, wherein a liquid pipe connected to said liquid exit comprises a sphere-like element arranged within said liquid pipe adjacent to said liquid exit, said liquid pipe further comprising a slot peripherally surrounding said sphere-like element and running into said liquid exit to deviate said cleaning liquid by causing said cleaning liquid to flow along said sphere-like element through said slot prior to exiting said liquid exit.

15. The fixed nozzle according to claim 14, wherein said liquid exit is a curved slot and has the shape of a segment of a circle.

16. The fixed nozzle according to claim 14, wherein said sphere-like element cooperates with said liquid exit, which is a curved slot or a straight slot.

17. A telescopic nozzle for cleaning systems particularly for motor vehicles comprising at least one hollow cylinder for applying a cleaning liquid onto a surface to be cleaned, wherein said hollow cylinder comprises a valve on one end or an opening for controlling the through-flow of said cleaning liquid on the other end, wherein the hollow cylinder comprises a liquid exit, a liquid pipe connected to said liquid exit, and a sphere-like element arranged within said liquid pipe adjacent to said liquid exit, said liquid pipe further comprising a slot peripherally surrounding said sphere-like element and running into said liquid exit to deviate said cleaning liquid by causing said cleaning liquid to flow along said sphere-like element through said slot prior to exiting said liquid exit.

18. The telescopic nozzle according to claim 17, wherein said hollow cylinder can be displaced against the force of a spring and wherein said valve can be opened by the pressure of said cleaning liquid when said telescopic nozzle is telescoped.

19. The telescopic nozzle according to claim 18, wherein said telescopic nozzle comprises a further hollow cylinder with a cross-sectional enlargement which cooperates with said opening of the other hollow cylinder in a certain displacement position of said other hollow cylinder to allow the through-flow of said cleaning liquid through said opening.

20. The telescopic nozzle according to claim 17 comprising a straight or a curved slot for applying said cleaning liquid onto a surface to be cleaned.

* * * * *